W. L. BLISS.
COVER FOR STORAGE BATTERIES.
APPLICATION FILED APR. 17, 1914.

1,245,428.

Patented Nov. 6, 1917.

Witnesses:

Inventor:
William L. Bliss

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

COVER FOR STORAGE BATTERIES.

BEST AVAILABLE COPY

1,245,428.  Specification of Letters Patent.  Patented Nov. 6, 1917.

Application filed April 17, 1914. Serial No. 832,466.

*To all whom it may concern:*

Be it known that I, WILLIAM L. BLISS, a citizen of the United States, residing at Niagara Falls, in the county of Niagara and State of New York, have invented new and useful Improvements in Covers for Storage Batteries, of which the following is a full, clear, concise, and exact description, reference being had to the accompanying drawing, forming a part of this specification.

My invention relates to covers for storage batteries.

An object of my invention is to provide an improved cover for storage batteries which will prevent the entrance of dust and dirt into the battery and the escape of fumes therefrom.

Another object of my invention is to provide improved means for preventing the moisture or condensation which collects on the cover from running down the outside of the battery.

Another object of my invention is to provide improved means for securing a storage battery cover in place.

Other objects of my invention will hereinafter appear.

I have illustrated one embodiment of my invention in the accompanying drawings, in which—

Figure 1:
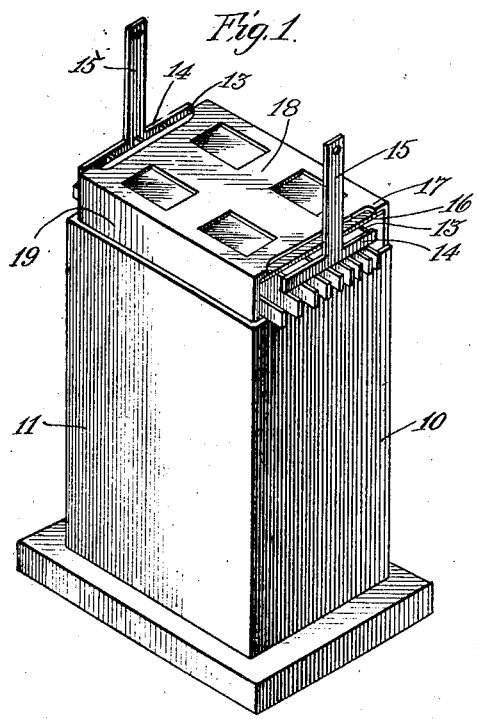
Figure 1 is a perspective view of a storage battery to which my invention has been applied.
Figure 2:
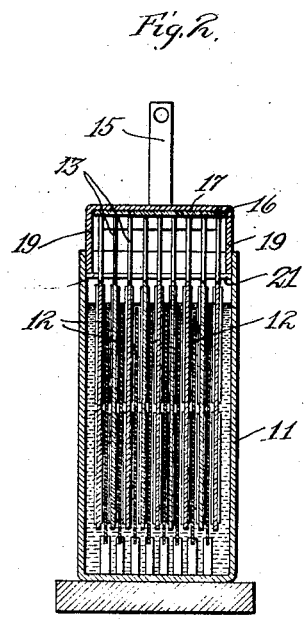
Fig. 2 is a central vertical section thereof.
Figure 3:
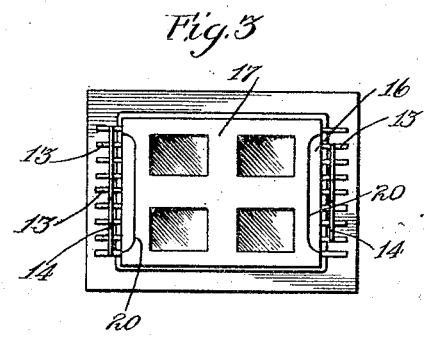
Fig. 3 is a top view of a battery with the cover in place.
Figure 4:
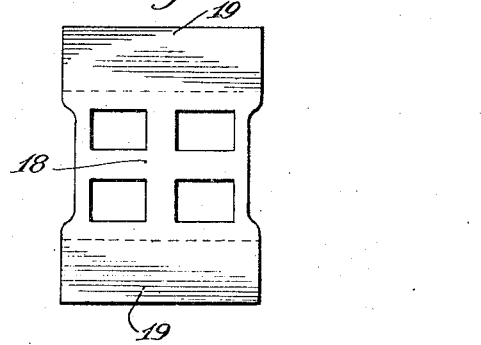
Fig. 4 is a top view of the blank from which the shield is formed.

The storage battery 10 comprises a receptacle or jar 11 in which are mounted a plurality of positive and negative battery plates 12. Each of the plates is provided at one of its upper corners with a terminal lug 13 that projects above the top of the battery jar. The plates are alternately arranged in the jar with the lugs of the negative plates all on one side and the lugs of the positive plates all on the other. The set of negative lugs, and the set of positive lugs are each provided with a terminal strap 14, having a vertical terminal post 15 connected thereto.

The battery jar is covered with a plate of glass or other suitable material 16, and a shield 17 substantially U-shaped in cross section which straddles the plate. The shield is formed from a sheet of lead, or other suitable material, of sufficient size to provide a middle portion 18 that lies flat across the top of the plate 16, and downwardly extending portions 19 at each end which embrace two sides of the plate and extend for a considerable distance therebelow. A hold down rod 21 of glass, or other insulating material, rests on the top of the plates to hold the customary separators, generally of wood, from displacement. The downwardly extending portions 19 of the shield are preferably made long enough to hold this rod down in place, in which case the usual holding projections on the battery plates may be dispensed with.

The cover when completely assembled is of substantially the same width and breadth as the interior of the battery jar 11. It is supported above the top of the jar on the battery plate lugs 13, and is confined between the terminal posts 15. The glass plate rests directly on the tops of the lugs and serves to insulate the shield therefrom. As the lugs extend for a considerable distance above the top of the jar, an open space is left between the bottom of the plate and the top of the jar. This space is closed on two sides by the downwardly extending portions 19 of the shield, which extend down into the top of the jar to assist in holding the cover against displacement.

In cases where the corners of the battery jar are rounded, the corners of the glass plate may be cut off diagonally so that there will be nothing to project beyond the edges of the jar.

If desired, the sides of the middle portion 18 of the shield adjacent to the terminal straps of the battery may be cut away as at 20 to prevent the shield from coming into contact with the straps or the terminal posts. The middle portion of the shield may also be perforated to save material and lessen the weight of the cover.

Both of the battery plates adjacent to the downwardly extending portions 19 of the shield are negatives so that no danger of short-circuiting will be incurred if the downwardly extending portions 19 should come into contact therewith.

By the improved construction all condensation and moisture which collects on the inside of the cover will be returned to the inside of the jar. Furthermore, all the large openings between the top of the jar and the cover plate are closed against the entrance of dust and the escape of fumes from the battery.

The embodiment of the invention described herein has been selected merely for the purpose of illustration. The invention covers all other means for accomplishing the desired result so long as such means fall within the scope of the appended claims.

What I claim as new and desire to secure by Letters Patent of the United States is:

1. In combination, a storage battery in which portions extend beyond the top of the battery jar and a cover therefor, said cover including an insulating plate supported by said projecting portions, and a channel member in contact with said insulating plate and having the sides thereof extending downwardly beyond the edges of the plate toward the edges of said receptacle.

2. The combination with a battery receptacle having members projecting above the top thereof of a cover supported by said members, said cover having a substantially horizontal portion and downwardly extending orifice closing portions.

3. The combination with a battery receptacle having lugs extending above the top thereof of a cover supported by said lugs, said cover having depending portions adapted to enter the top of said receptacle.

4. In combination, a battery receptacle, a plurality of plates mounted in said receptacle, said plates having members projecting above the top of said receptacle, and a cover supported by said members, said cover having downwardly extending orifice closing portions.

5. A cover for storage batteries including a substantially flat plate, and a member straddling said plate, said member having depending orifice closing portions.

6. A storage battery including an open ended battery receptacle, a plurality of battery plates within said receptacle having portions projecting beyond the open end thereof, a closure for said receptacle, said closure including an insulating plate supported on said projecting portions and retaining means for said plate fitting into the open end of said receptacle.

7. A storage battery including an open ended receptacle, a plurality of battery plates having portions extending above the edges thereof and having terminal posts at each side of the battery extending from said projecting portions, and a closure for said receptacle including an insulated portion supported on said projecting portions and held from displacement by said terminal posts and having depending portions fitting into the open end of said receptacle.

In witness whereof, I have hereunto subscribed my name in the presence of two witnesses.

WILLIAM L. BLISS.

Witnesses:
G. H. BURRELL,
C. A. SCHAEFER.